US011544488B2

(12) United States Patent
Polosa et al.

(10) Patent No.: US 11,544,488 B2
(45) Date of Patent: Jan. 3, 2023

(54) NONWOVEN MATERIAL HAVING ENCODED INFORMATION, A METHOD FOR ENCODING INFORMATION ON A NONWOVEN MATERIAL AND A SYSTEM FOR USING SAME

(71) Applicant: Suominen Oyj, Helsinki (FI)

(72) Inventors: Gian Luca Polosa, Varese (IT); Justin Boncher, Green Bay, WI (US); Tero Haaparanta, Nakkila (FI); Markku Koivisto, Kauniainen (FI); Oskari Heikel, Helsinki (FI); Olli Paloheimo, Espoo (FI); Hemmo Latvala, Helsinki (FI); Samuli Manninen, Helsinki (FI)

(73) Assignee: Suominen Oyj, Helsinki (FI)

( * ) Notice: Subject to any disclaimer, the term of this patent is extended or adjusted under 35 U.S.C. 154(b) by 0 days.

(21) Appl. No.: 16/771,703

(22) PCT Filed: Dec. 11, 2018

(86) PCT No.: PCT/FI2018/050902
§ 371 (c)(1),
(2) Date: Jun. 11, 2020

(87) PCT Pub. No.: WO2019/115875
PCT Pub. Date: Jun. 20, 2019

(65) Prior Publication Data
US 2021/0073493 A1    Mar. 11, 2021

Related U.S. Application Data

(60) Provisional application No. 62/627,225, filed on Feb. 7, 2018, provisional application No. 62/596,927, filed on Dec. 11, 2017.

(51) Int. Cl.
*G06K 7/14* (2006.01)
*G06K 19/06* (2006.01)
(Continued)

(52) U.S. Cl.
CPC ............ *G06K 7/143* (2013.01); *D04H 1/495* (2013.01); *D04H 13/00* (2013.01); *G06K 19/06131* (2013.01)

(58) Field of Classification Search
USPC ........................................... 235/462.01, 494
See application file for complete search history.

(56) References Cited

U.S. PATENT DOCUMENTS

| 4,493,868 A | 1/1985 | Meitner |
| 5,045,094 A * | 9/1991 | Paranjpe ............. B01D 39/163 95/273 |

(Continued)

FOREIGN PATENT DOCUMENTS

| EP | 2995566 A1 | 3/2016 |
| EP | 3187635 A1 | 7/2017 |

(Continued)

*Primary Examiner* — Tuyen K Vo
(74) *Attorney, Agent, or Firm* — Laine IP Oy (57) ABSTRACT

A nonwoven is provided having a pattern displaying at least two groups of areas having different optical properties distinguishable to reading and decoding equipment. The pattern may be arise from differences in the microstructure of the web. The nonwoven material may have an embossed pattern having a basic, static component and a dynamic component which varies within a given length of the nonwoven web. Further, a method is provided for obtaining information from a nonwoven web, comprising observing the web surface using an optical reading device, collecting data based on differences in optical properties in the web surface, storing in a digital memory a pattern based on the collected data and comparing the stored pattern to a collection of previously stored patterns.

25 Claims, 10 Drawing Sheets

(51) Int. Cl.
*D04H 13/00* (2006.01)
*D04H 1/495* (2012.01)

(56) References Cited

U.S. PATENT DOCUMENTS

| | | | | |
|---|---|---|---|---|
| 6,093,665 | A * | 7/2000 | Sayovitz | D04H 1/559 |
| | | | | 428/156 |
| 6,621,915 | B1 | 9/2003 | Chen et al. | |
| 7,006,669 | B1 | 2/2006 | Lavagnino | |
| 9,022,280 | B2 * | 5/2015 | Goyal | G06F 19/00 |
| | | | | 235/375 |
| 9,251,634 | B1 * | 2/2016 | Fraser | G06K 19/06037 |
| 2003/0122369 | A1 | 7/2003 | Chenel | |
| 2004/0118530 | A1 * | 6/2004 | Kressner | B32B 5/26 |
| | | | | 162/109 |
| 2005/0170726 | A1 * | 8/2005 | Brunson | B32B 5/022 |
| | | | | 442/327 |
| 2009/0291280 | A1 * | 11/2009 | Hartert | D03D 13/008 |
| | | | | 428/218 |
| 2010/0199406 | A1 * | 8/2010 | Dua | B32B 7/12 |
| | | | | 2/115 |
| 2012/0146784 | A1 * | 6/2012 | Hines | A42B 3/046 |
| | | | | 340/539.11 |
| 2012/0205449 | A1 * | 8/2012 | Lewis | G06K 19/06037 |
| | | | | 235/468 |
| 2012/0256750 | A1 * | 10/2012 | Novak | A61F 13/42 |
| | | | | 340/573.5 |
| 2016/0239734 | A1 * | 8/2016 | Metz | G06K 19/06037 |
| 2016/0292486 | A1 * | 10/2016 | Prusik | G06K 19/06046 |
| 2017/0151103 | A1 * | 6/2017 | Bianchi | A61F 13/51394 |
| 2017/0191198 | A1 * | 7/2017 | Ashraf | D01D 5/0985 |
| 2018/0168893 | A1 * | 6/2018 | Ashraf | D04H 3/147 |

FOREIGN PATENT DOCUMENTS

| | | | | |
|---|---|---|---|---|
| WO | WO 91/19614 | * | 12/1991 | B42D 15/10 |
| WO | WO9423107 | A2 | 10/1994 | |
| WO | WO9509261 | A1 | 4/1995 | |
| WO | WO0078883 | A1 | 12/2000 | |
| WO | WO0194698 | A1 | 12/2001 | |
| WO | WO0199095 | A2 | 12/2001 | |
| WO | WO2004085730 | A1 | 10/2004 | |
| WO | WO2008026106 | A2 | 3/2008 | |
| WO | WO2015200572 | A1 | 12/2015 | |
| WO | WO2017083850 | A1 | 5/2017 | |
| WO | WO2017095584 | A1 | 6/2017 | |
| WO | WO2017106080 | A1 | 6/2017 | |
| WO | WO2017190717 | A1 | 11/2017 | |

* cited by examiner

NONWOVEN MATERIAL HAVING ENCODED INFORMATION, A METHOD FOR ENCODING INFORMATION ON A NONWOVEN MATERIAL AND A SYSTEM FOR USING SAME

FIELD OF THE INVENTION

The invention is in the field of encoding information in a pattern. More specifically, the invention is directed to a nonwoven material having a pattern comprising details which are optically readable and decodable for providing meaningful information, to a method of producing a nonwoven material having a pattern for embedding information; and a system for utilizing information disposed in a nonwoven material.

BACKGROUND

Information conveyed using barcode-type encoding is commonly used in labels, envelopes and packages of various kinds. Today, optically readable information is increasingly being embedded in the surface of objects or on packaging materials. If required, this can be carried out in a manner making the markings more or less invisible to the naked eye. The technology is often referred to as digital watermarking. It can be used for securing the authenticity of a document or an object. Examples of such use are ID documents, bank notes, passports, etc.

Using such technology, viewing an object with a device capable of decoding the embedded information can also display various kinds of technical or other information related to the object. Further, code thus included in a viewed object can trigger software to display e.g. augmented reality effects related to the object.

A nonwoven may be defined as a manufactured sheet, web or batt of directionally or randomly oriented fibres, bonded by friction and/or cohesion and/or adhesion, excluding paper. Wetlaid nonwoven may be distinguished from paper based on the length to diameter ratio of the fiber used: nonwoven is made up from fiber having a greater such ratio than paper. The fibers used in nonwoven may be natural, man-made or synthetic; often, mixtures of these are employed.

SUMMARY OF THE INVENTION

According to an aspect of the present invention, a nonwoven is provided having a pattern displaying at least two groups of areas having different optical properties distinguishable to reading and decoding equipment, so as to provide a steganographic marking.

According to an aspect of the present invention, barcode type information is included in a pattern on a nonwoven web.

According to a further aspect, the pattern is formed of differences in the microstructure of the web, caused by variations in e.g. fibre grade, fibre type, carding velocity, line velocity and the difference between these velocities; or in hydroentangling parameters such as water pressure, dewatering as determined through hole size and vacuum grade; drying temperature and line velocity in drying.

According to a further aspect of the invention, a method is provided for obtaining information from a nonwoven web, comprising observing the web surface using an optical reading device, collecting data based on differences in optical properties in the web surface, storing in a digital memory a pattern based on the collected data and comparing the stored pattern to a collection of previously stored patterns.

According to a further aspect of the invention, a device for implementing the above method is provided, comprising an optical reading device and a digital memory and configured to observe the web surface using the optical reading device, collect data based on differences in optical properties in the web surface, store in the digital memory a pattern based on the collected data and compare the stored pattern to a collection of previously stored patterns.

According to a further aspect of the present invention, the nonwoven material according to the invention is produced using an embossing sleeve with a high-precision pattern, and hydroentanglement. Thus, a uniform and stable embossing result capable of encoding information is obtained.

According to an embodiment, the nonwoven material has an embossed pattern having a basic, static component and a dynamic component which varies within a given length of the nonwoven web. Preferably, the variation in the dynamic component is not directly discernible to the naked eye.

According to a further embodiment, the nonwoven material according to the invention has been subjected to thermoembossing.

According to a further embodiment, the nonwoven material according to the invention has been subjected to thermoembossing and hydroembossing.

According to a further embodiment, the material according to the invention has, in addition to an embossed pattern, at least one further marking capable of conveying steganographic information. The further marking or markings may be e.g. printed.

According to a further aspect of the present invention, a system is provided for utilizing a nonwoven material having encoded information, the system comprising a nonwoven having a pattern displaying at least two groups of areas having different optical properties distinguishable to reading and decoding equipment; and means for reading and decoding the information embedded in the nonwoven material.

According to an embodiment of the present invention, the system comprises the ability to trigger an event dependent on the information encoded in the nonwoven material. The event is launched using the means for reading and decoding the information, and may involve visual and audible effects.

According to an aspect of the present invention, a system is provided for identifying a nonwoven web material based on an individual optically identifiable pattern. The pattern may relate to the equipment with which the nonwoven material is produced, or to the type or grade of the nonwoven material.

According to an advantageous embodiment, data is collected using an optical reading device such as a digital camera, to identify a pattern typical of the specific production equipment for the relevant nonwoven web. Thus, a pattern due to differences in the overall structure of the material is observed and compared to a number of patterns in a repository, collected from different equipment and production lines. Such patterns need not include variable components, but represent general characteristics typical of a specific fabric grade produced on a specific production line. The definition of threshold values and ranges within which a measured parameter may vary is required for discerning production lines. Various production parameters may be varied to achieve required differences in measured parameters.

According to a further advantageous embodiment, data is collected using an optical reading device such as a digital camera, to identify a pattern typical of a particular grade or type of nonwoven material. Thus, a pattern due to differences in the overall structure of the material, caused by differences in e.g. the chemical composition of materials and in their physical dimensions, is observed and compared to a number of patterns in a repository, collected from a variety of nonwoven materials.

BRIEF DESCRIPTION OF THE DRAWINGS

FIGS. 6 A-B show a pattern which can be generated using rotatable elements integrated into an embossing sleeve.

DETAILED DESCRIPTION

The nonwoven material according to the present invention includes at least two groups of areas having different optical characteristics which may be discernible to the eye or readable using technical aids. Preferably, there are at least three groups of areas having different optical characteristics.

In another advantageous embodiment, there are two levels of information-encoding patterning: Macroscopic and microscopic. Macroscopic texture is visible to the naked eye whereas microscopic requires a tool. Several categories of information may be encoded on both levels. The macroscopic level may act as a position reference for information at the microscopic level in a manner known per se.

Encoding on both levels may be static or dynamic. Static information remains unchanged during production of the nonwoven product. Dynamic information changes as production proceeds. Thus, both information relating to the unchanging properties of the material, e.g. composition and basic structure, and information relating to the properties of individual sections of material, e.g. batch or time of production, may be encoded.

In an embodiment of the invention, groups of areas are hydroembossed onto the nonwoven web so as to provide at least two groups of areas having different optical properties. The difference in optical properties is achieved by different depths of embossing. A greater height in the web contains more fibers. The differences in mass of fibers between valleys and peaks in the web surface profile provide a difference in opacity, which is detectable for encoding purposes.

Advantageously, at least three groups of areas having different optical properties are provided. A first group is represented by the uncompressed basic surface level of the nonwoven. A second group is has an intermediate level of compression, and a third group has a maximum level of compression.

Additional groups of areas having differing densities and thus differing optical properties may be provided.

In one embodiment, the nonwoven is embossed to display a pattern visible to the unaided eye. Such a pattern advantageously comprises repeating geometric shapes. The geometric shapes are advantageously formed by ridges having a width in the range of 1.5 to 2 mm in the mentioned plane or a parallel plane.

Advantageously, the fiber used to form a nonwoven material according to the invention has a dimension of 1.3 to 2 dtex, corresponding to about 10 to 12 μm when a circular cross section is assumed.

The fiber may be natural, natural manmade or synthetic. Preferably, at least part of the fiber is manmade fiber.

Advantageously, at least part of the fiber used in the nonwoven material of the present invention is crimped. Preferably, the number of crimps per cm is about 4. Crimping enhances fiber consolidation and cohesion to the embossing template, thereby giving rise to a nonwoven having a stable embossing.

According to a further aspect of the present invention, a method is provided for manufacturing a nonwoven material having at least two groups of areas with different optical properties, capable of encoding optically readable information. According to the method, a nonwoven material is produced forming a web which may be for example carded, wet laid, airlaid, spunlaid, or meltblown.

Preferably, the nonwoven material is hydroentangled. This method provides a stable macroscopic and microscopic pattern which lends itself to encode steganographic markings when used with an embossing roller and fiber compositions as described herein.

The nonwoven material is preferably embossed using an embossing sleeve. The embossing pattern and its properties are advantageously determined by a detachable embossing sleeve imposed on the surface of a suction drum, which in hydroentangling is preferably a suction drum designed to remove the water directed against the nonwoven material using dedicated nozzles.

When a hydroentangling plant is provided with several successive hydroentangling stations, as is often the case, at least the first station may be dedicated to bonding only while one or more subsequent stations may perform hydroembossing. Of the stations performing hydroembossing, if e.g. two are employed, one may provide a static pattern and another a dynamic pattern; both may provide different static patterns; or both may provide dynamic patterns, all to provide a final resultant pattern. A further option is that hydroentanglement is carried out at one station and thermoembossing at another station. Also, a static pattern may be generated using hydroembossing and/or thermoembossing while a changing pattern is generated using laser, ultrasound or corresponding technologies.

The embossing pattern is proportional to the diameter of the fiber. Thicker fiber needs a wider embossing pattern to set properly. The depth of the embossing pattern is proportional to the basis weight of the nonwoven material to be produced. With higher gsm (grams per square meter), the embossing depth needs to be larger.

The dimensions of the surface pattern of the sleeve are designed according to the properties of the web involved. The length of fiber used influences the dimensions and ratios of the sleeve surface structure.

The nonwoven material according to the invention may have a basic weight in the range of 20 gsm to 120 gsm.

Generally, the greater the basic weight of the fabric, the larger the surface pattern may be since more material is available for filling the depressions in the surface. For example, for a fabric having a basis weight of 70 gsm, the width of depressions in the sleeve is preferable in the range of 800 to 2500 µm, more preferably in the range 850-2200 µm; even more preferably in the range 900-2000 µm. For a fabric having a basis weight of 35 gsm, the width of depressions in the sleeve is preferable in the range of 350-1000 µm; more preferably in the range 400-900 µm; most preferably in the range of 500-800 µm.

Generally, coarse fibers are needed in a lesser amount for reaching a certain basic weight of the nonwoven fabric. On the other hand, they do not lend themselves to embossing as well as thinner fibers which will easily fill out the voids in an embossing template. Thinner fibers, however, are more difficult to card and may stick to the equipment. To gain the benefits of both coarse and thin fibers, splittable fibers are advantageously used. These may be carded easily, and in a hydroentanglement operation they split so as to provide the benefits of thinner fibers in hydroembossing and patterning. For example, splittable fibers could be from 2.2 to 3 dtex and split into for example 16 wedges of down to 0.2 denier per filament.

Fiber variability may be used for coding. Special fibers or standard fibers of various grades may be used. A change in fiber dimension, defined e.g. by the dtex value, comes with a change in fabric appearance. The cross sectional shape of the fiber influences i.a. the opacity and reflective properties of the fabric. For example, trilobal fiber may replace round fiber.

The macroscopic pattern on the nonwoven, visible to the naked eye and readable using an optical input device, e.g. a camera, may provide information on the fiber composition and thus the preferred use of the nonwoven.

According to an embodiment of the invention, a visible, repeating pattern comprising a number of variable elements is applied to a nonwoven fabric, whereby the elements can be set in two discrete states, for example enabled-disabled, existent—nonexistent. The pattern further comprises an orientation element. Thus, a binary encoding system can be utilized. The number of variable elements determines the possible amount of information.

A further possibility to produce a variable pattern arises with exchangeable plugs integrated into the embossing sleeve. Complete graphic elements or their parts may be substituted. For example, a flower symbol may be changed into another, or the number or shape of petals may be varied.

Instead of exchangeable plugs, non-detachable but movable elements may be used. Rotatable elements provide the option of placing an element in a desired number of positions, encoding information correspondingly. For example, if a symbol has a clear direction indicator and it is rotated through eight different positions, using four symbols provides a character space of $8^4$ or 4096; i.e. a 12-bit code domain.

Figure 1A:
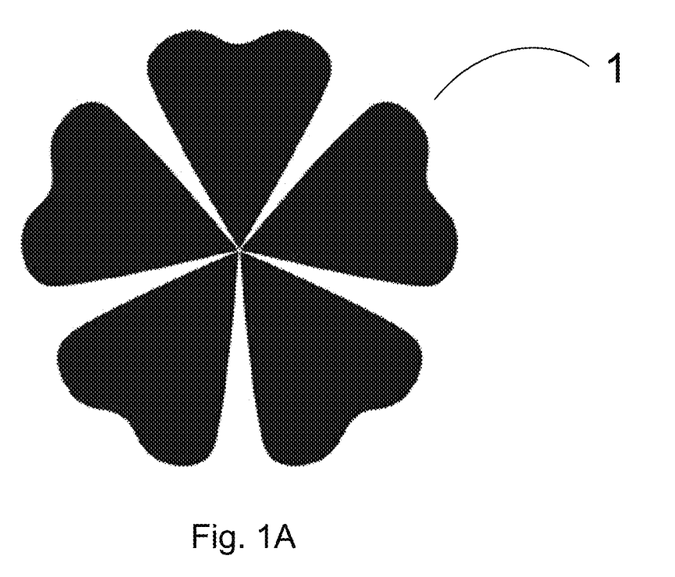
FIGS. 1A-F shows embodiments of the invention wherein binary information is encoded in a visible, repeating machine readable pattern.
Figure 1B:
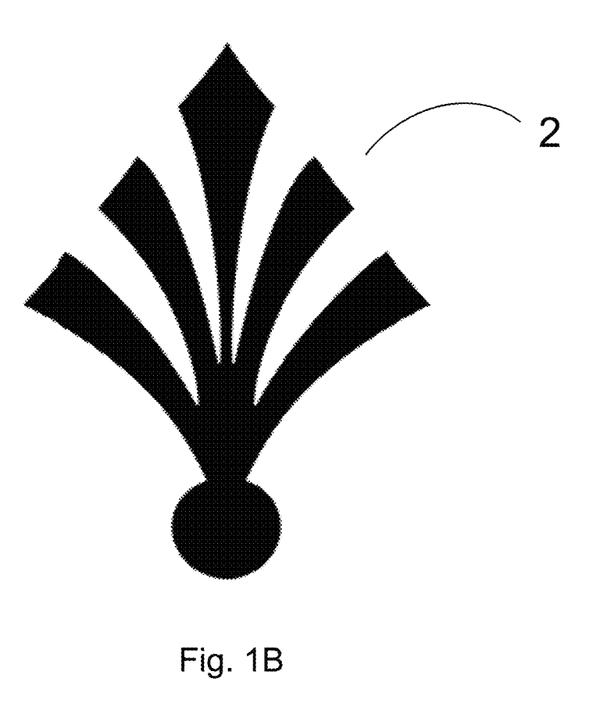
Figure 1C:
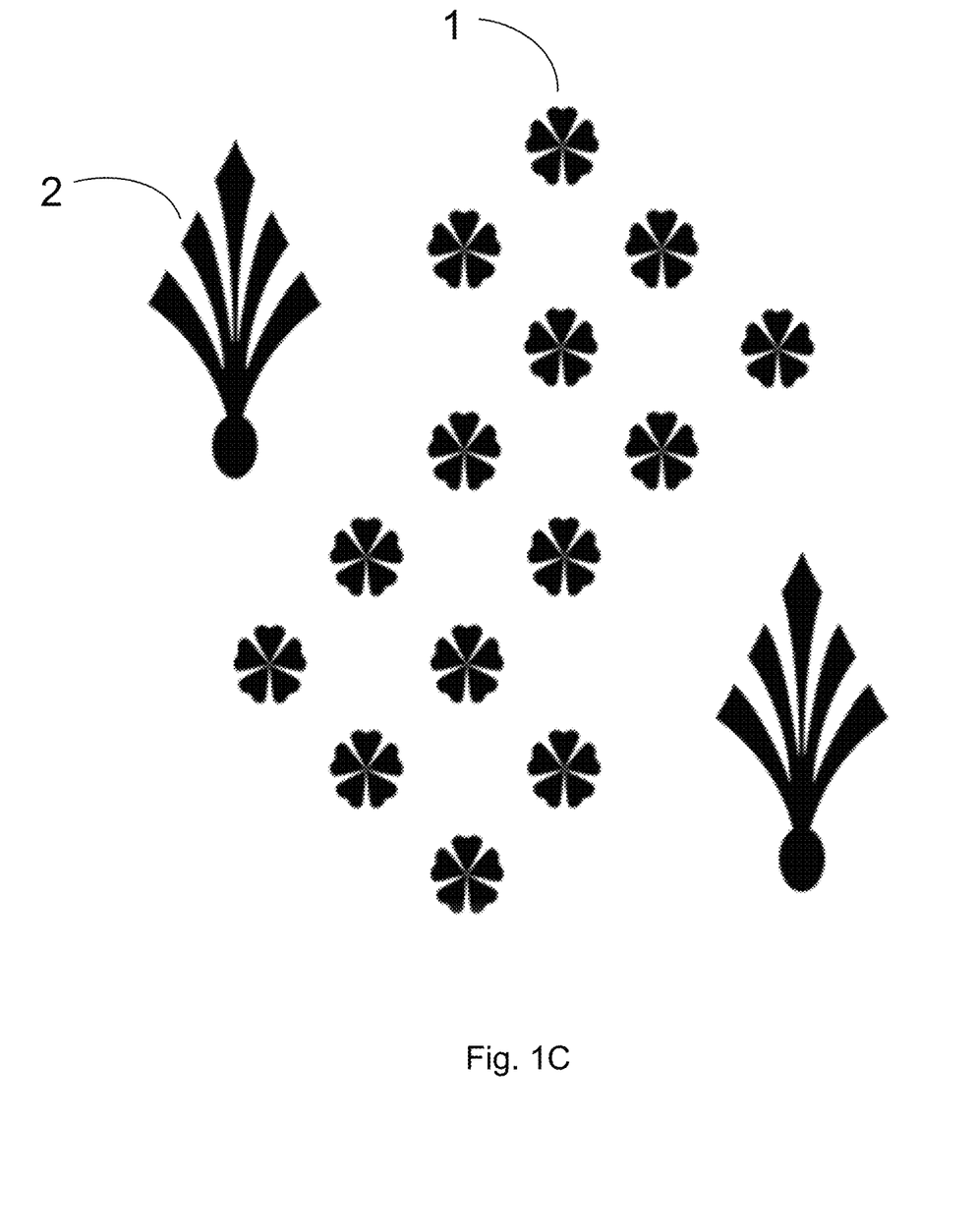

FIG. 1A shows an example of a variable element 1, here in the form of a five-leaf clover. FIG. 1B shows an example of an orientation element 2 associated with the variable elements. The orientation element has features for distinctly expressing direction, and indicates the manner in which a group of variable elements shall be read. FIG. 1C shows a set of variable elements 1 and orientation elements 2, expressing a binary number. The set includes 14 variable elements, and all of these are present. Thus, the encoded number is $2^{14}-1$ or 16 383.

Figure 1D:
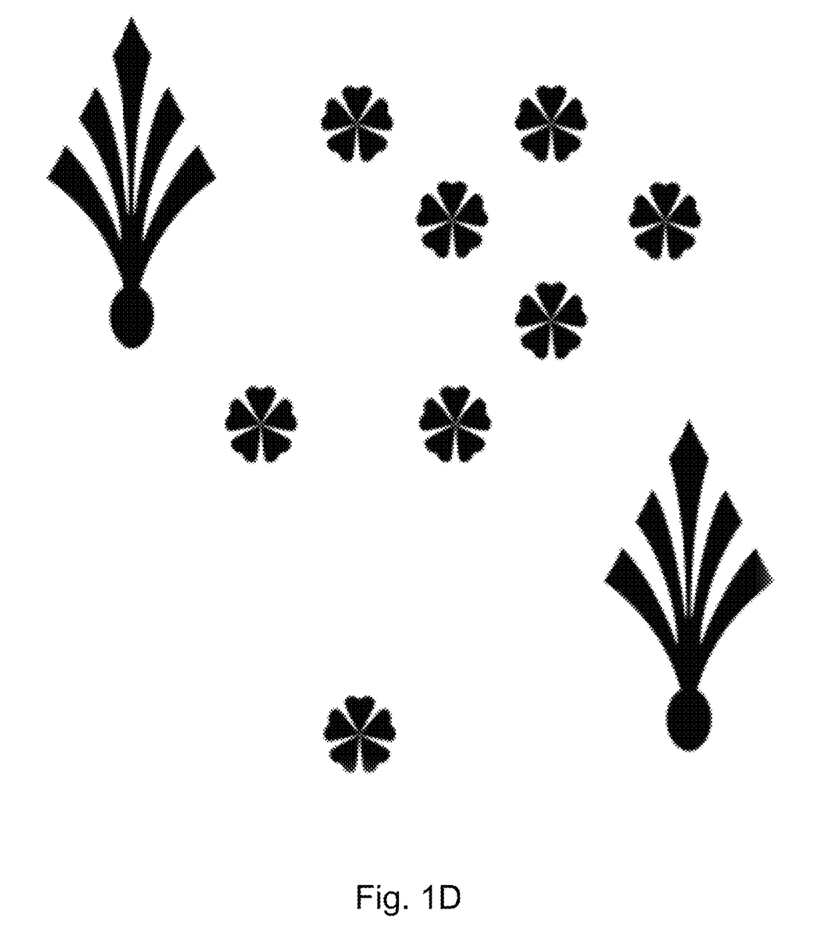
Figure 1E:
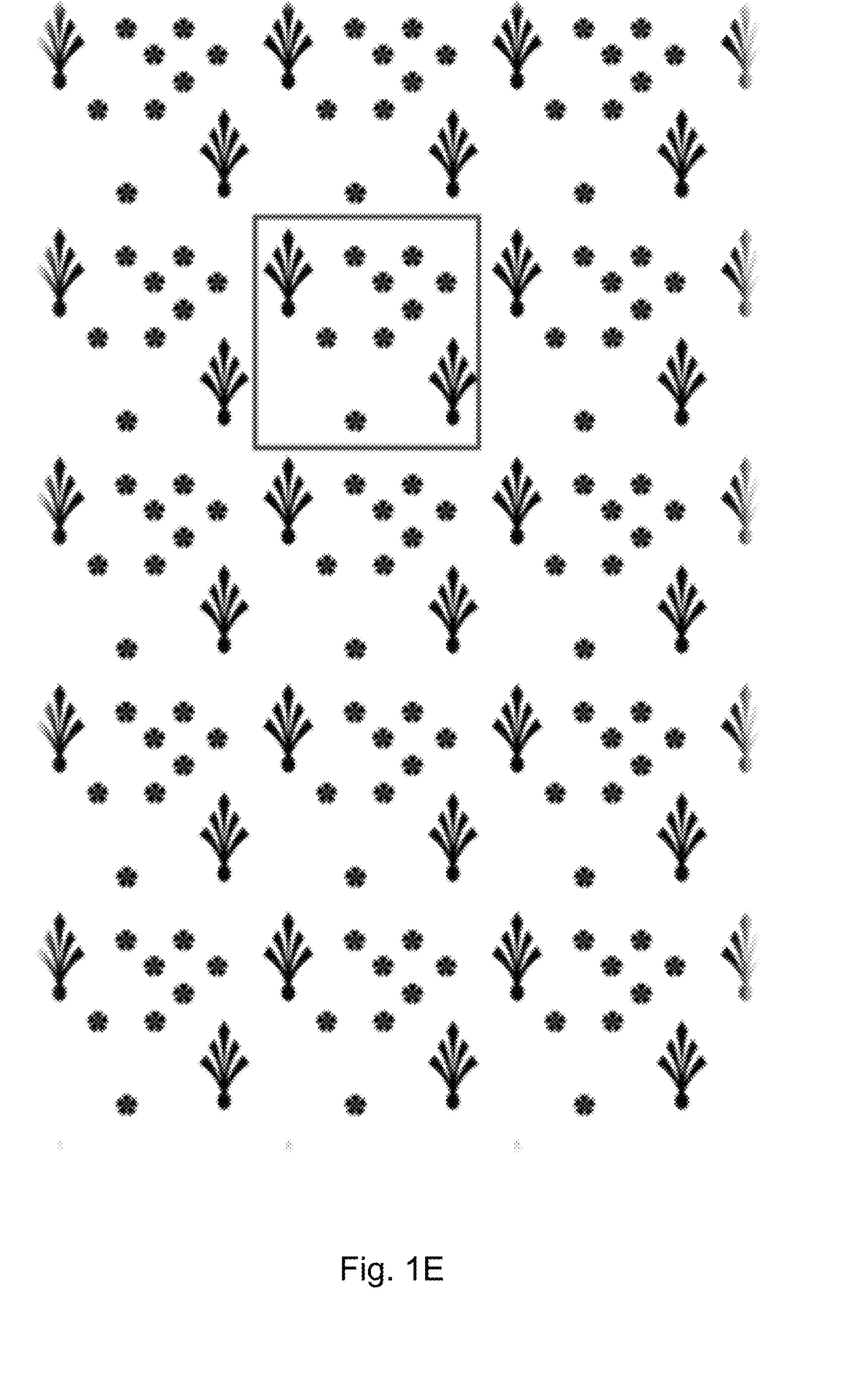

FIG. 1D shows a representation of the number 8670, encoded using the presence or non-presence of elements 1 in the 14-element pattern. Present are the elements representing $2^1, 2^2, 2^4, 2^6, 2^2, 2^8$ and $2^{13}$. FIG. 1E shows the possible appearance of a sheet encoded with this repeating pattern.

Figure 1F:
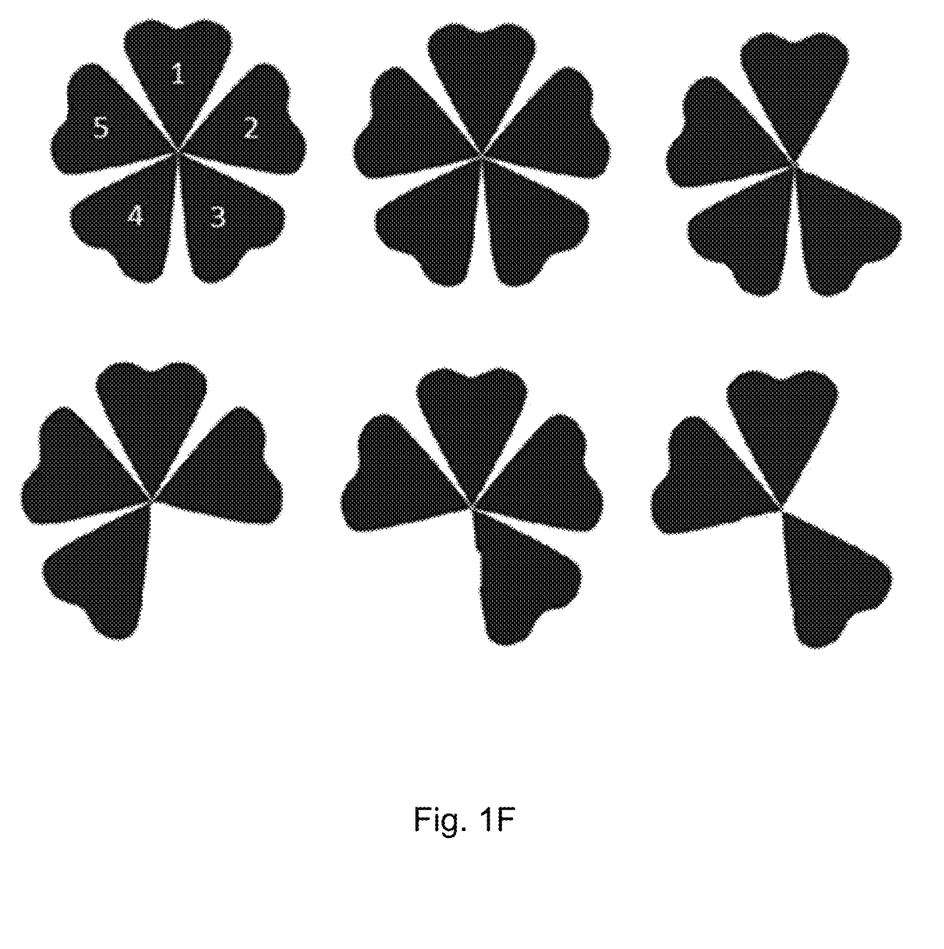

Further information can be encoded by modifying the variable elements 1. The degree of modification is mainly limited by the capability of machine vision hardware and software to identify the differences. FIG. 1F shows how the presence or nonpresence of sections of the variable elements may be used to produce additional variation. In this example, the amount of leaves on the five-leaf clover has been varied to express binary numbers. The orientation element makes it possible to identify which leaf represents which bit; in this example, the increasing order is clockwise beginning with the uppermost leaf. Thus, the lower right corner pattern encodes $2^0, 2^2$ and $2^4$, or 21.

In addition to identifying the orientation and starting point of the code pattern set, the orientation element 2 can be employed to identify specifics of the individual web, e.g. the production line from which it originates. Different production lines may have different orientation elements.

Figure 2A:
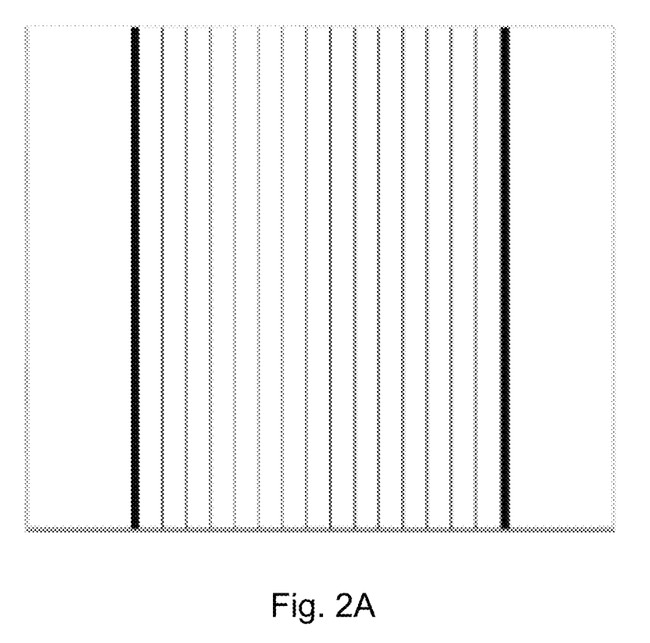
FIGS. 2A-B shows other embodiments of the invention, wherein binary information is encoded in a continuous striped pattern in the machine direction of a web.
Figure 2B:
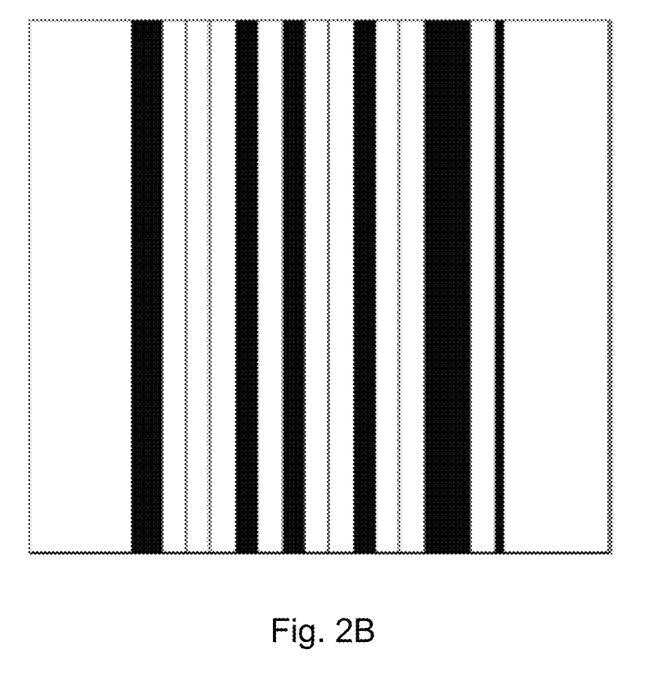

According to a further embodiment of the invention, a striped barcode pattern is applied to a nonwoven fabric in the machine direction. The stripes can continue along an arbitrary length of the web. Preferably, thicker lines along the outer borders of the line pattern indicate the limits of the coded area. The line pattern is advantageously produced by an additional accessory mounted on an embossing roll which produces a repeating pattern. As with repeating pattern sets, barcodes can store an ID that can be used for tracking a product. FIG. 2A shows a barcode template, and FIG. 2B shows the number 19886 encoded using the template.

Figure 3:
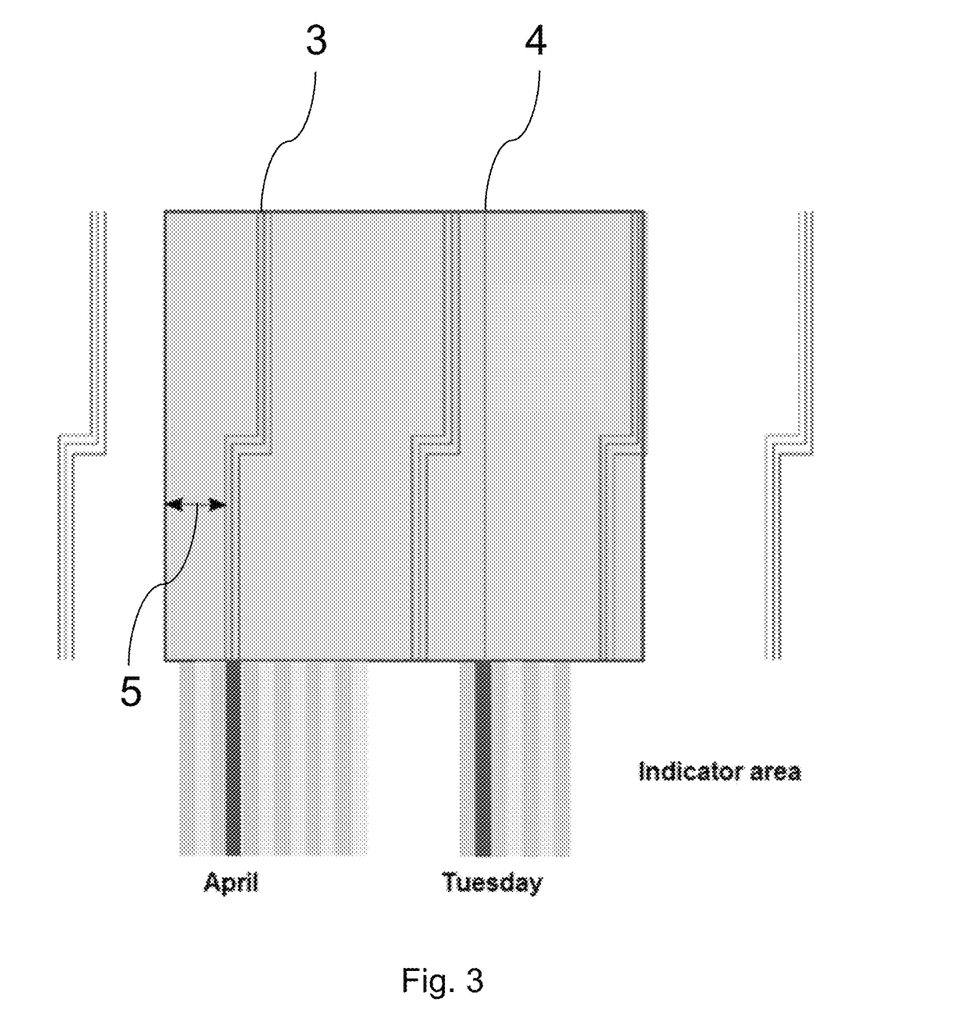
FIG. 3 shows another embodiment of the invention, where information is encoded using the location of a continuous pattern across the cross machine direction of a web.

According to a further embodiment of the invention, one or more continuous patterns 3, 4 is/are applied to specific area(s) along the machine direction of a nonwoven web, and information is associated with the location of the relevant pattern in the cross machine direction of the web. FIG. 3 shows an example of a cross-direction movable pattern 3 which may be used for encoding e.g. date of production. The relevant variable parameter is the distance 5 of the pattern from the longitudinal edge of the web. The distance 5 can be varied by controlling the slitting operation.

Figure 4:
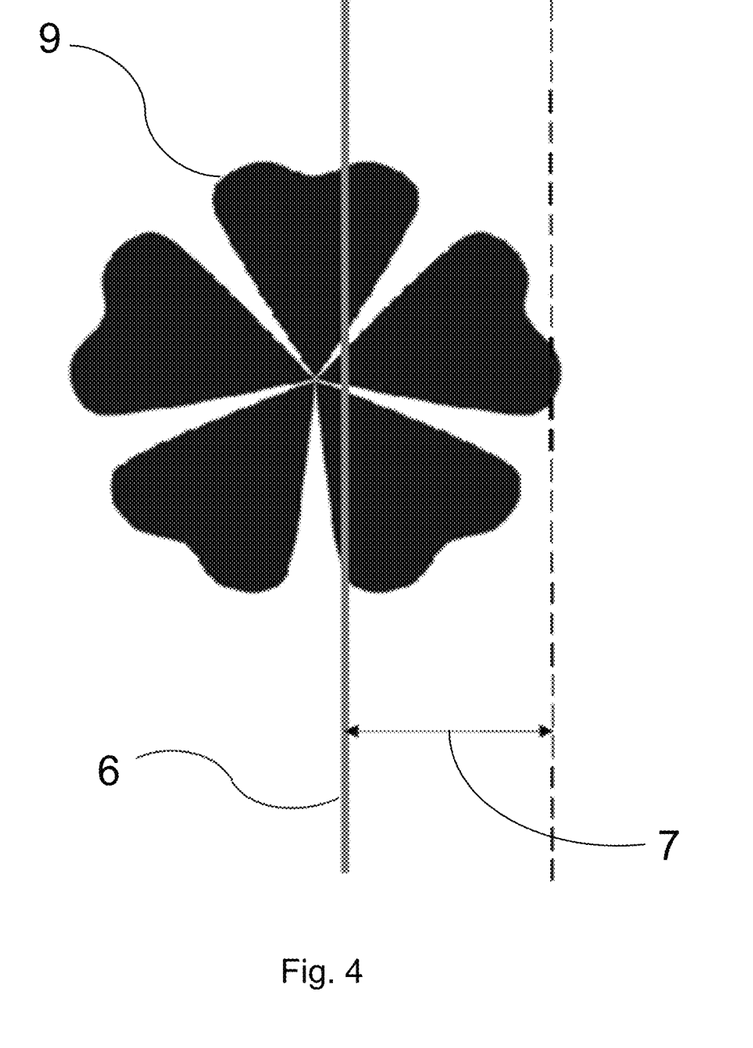
FIG. 4 shows another embodiment of the invention, where the location of a continuous pattern is determined in relation to a repeating pattern, and FIGS. 5 A-B show further embodiments, where information is encoded using two embossing rolls with differing modular patterns.

Continuous patterns may also be combined with repeating patterns, whereby a repeating symbol may provide a reference for the continuous pattern instead of an edge of the web. FIG. 4 shows a continuous pattern 6, here a line, the position of which is defined by its offset 7 relative to the edge 8 of repeating FIG. 9. Offset 7 may be given discrete values for encoding selected information. Continuous pattern 6 may be imposed by various methods, e.g. printing, embossing or modifying a hydroentanglement process.

According to a further embodiment, modular embossing rolls with different patterns are employed. This allows for sophisticated data encoding by altering the modules used per production run.

Figure 5A:
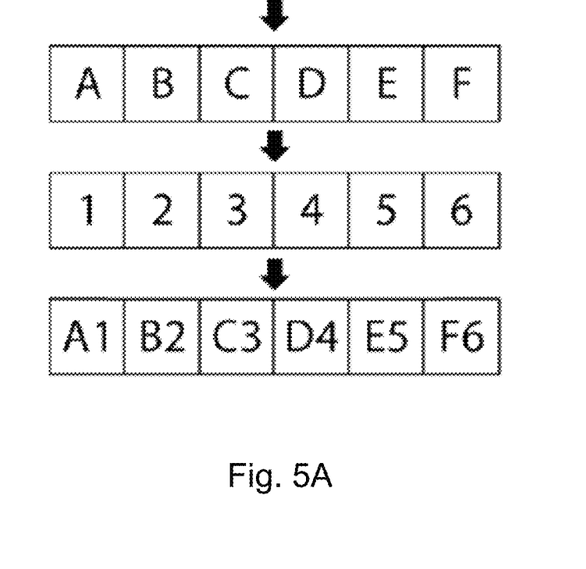

FIG. 5A shows how two rolls with differing modular pattern can imprint unique identifiers. Roll 1 first imprints various unique patterns, here expressed by letters A through F. Subsequently, the fabric passes to roll 2 which imprints another unique pattern, expressed as numbers 1 through 6. As a result, the fabric exhibits a combination of the two patterns, here indicated as a combination of the two identifiers from the respective rolls.

Figure 5B:
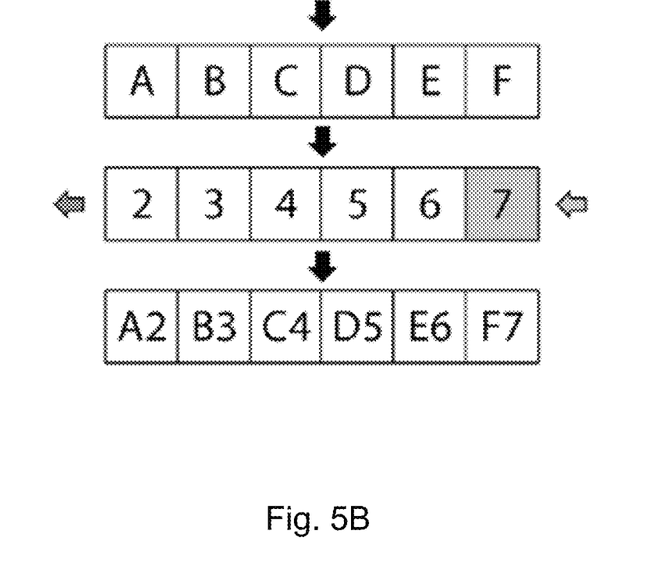

The modules can be shifted to generate a multitude of unique patterns. The amount of possible identifiers depends on how many interchangeable modules are available for the rolls. FIG. 5B shows an example of how new identifiers are created by removing module 1 from the end of roll 2 in the previous example, while adding module 7 to the other end, whereby all modules are shifted to the left. This creates a new unique pattern.

The modular roll system allows for a potentially infinite number of variations, as more modules are added over time. Assuming 10 patterns for both rolls, it is possible to create 100 unique identifiers and by varying the module order, the number increases considerably.

Each time the roll pattern is to be changed, a message is sent to a database that production is to begin with a new ID. This database will send a response for the roll indicating the next free ID. The roll pattern will then be altered to match the encoding for that ID.

Figure 6A:
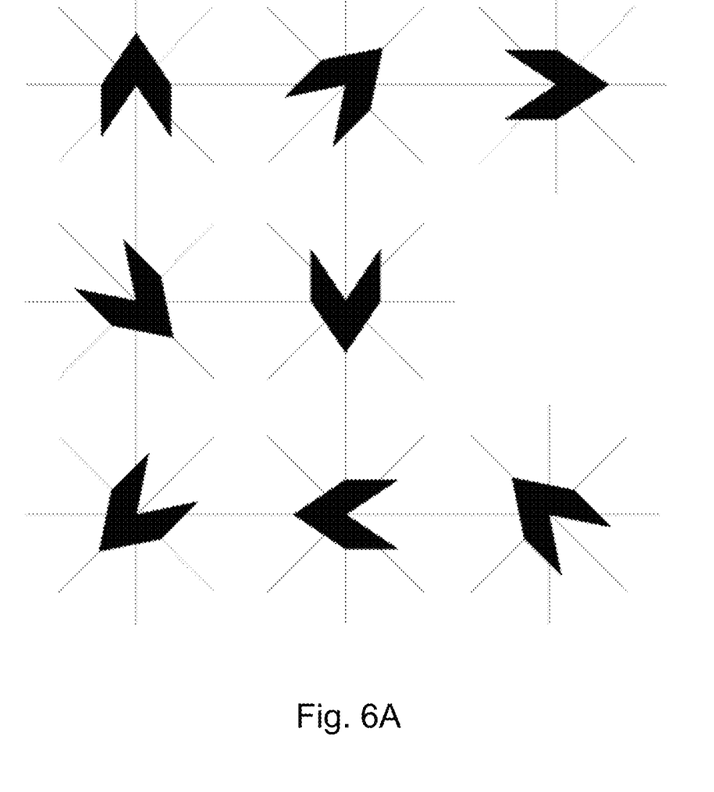
Figure 6B:
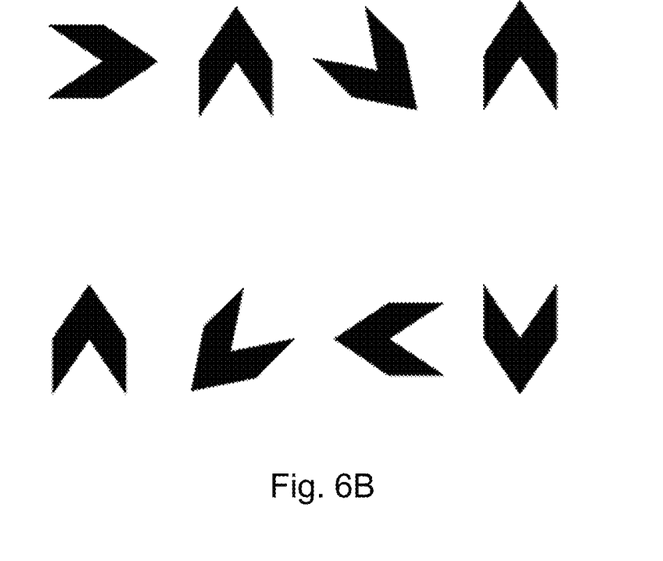

FIG. 6A-B shows an example of a pattern which can be generated using rotatable elements integrated into an embossing sleeve. The symbol has eight defined rotational orientations as shown in FIG. 6A. Four symbols as shown in FIG. 6B thus provides a 12-bit code.

By decoding the sheet's pattern, it will be possible to retrieve the matching ID in the database and retrieve data regarding the production run it was manufactured.

If data is encoded visibly into the fabric, it is possible for a person to decode the ID from the pattern if the person is aware of the structure of the pattern. A computer vision powered application can be developed for those who do not have the possibility to decode the visible identifiers. Such an application may be implemented in a mobile or a stationary device.

It is to be understood that the encoding principle is not limited to the examples shown. The skilled person may vary the symbols and their variation in any manner that serves the purpose of applying useful code to a nonwoven material.

Once an ID has been coded, a database can be queried to retrieve the information that has been stored and associated with the ID. Examples of date that could be stored:
Time when production under this ID started and ended
Production line and its location
Material used
Importer
Recipient
Final product for which the fabric was intended Microscopic or macroscopic pattern details can be read using an optical input device e.g. a smartphone camera. Thus embedded code may be read by a smartphone app and trigger various visual effects or display product information. Marketing campaigns, consumer competitions and lotteries and the like can also be based on such app-readable code.

According to an embodiment of the invention, there is provided a system comprising a nonwoven web according having an embossed pattern comprising at least two groups of areas having different machine readable optical properties, said areas arranged to encode optically readable information which may not be discernible to the naked eye; the system further comprising means for reading and transmitting the information. Such means may be for example a camera, possibly a smartphone camera, a spectrometer or another device suitable for optical input.

The system further comprises a computing device to which the read information is transmitted, and where a decoding and pattern recognition operation is carried out. If a pattern included in a database of the computing device is recognized, a response is sent to the means for reading and transmitting the information.

According to a further embodiment of the invention, there is provided software means for triggering an event in dependence of the optical information read by the reading and transmitting means and processed by the computing device. Such an event may be a display of graphic information in the form of pictures or video, possibly as an overlay to produce an augmented reality effect.

A system according to the invention may further comprise means for displaying characters, pictures or video feed as well as sound based on the information encoded into the pattern embossed on the nonwoven material. Such means for displaying may be an LCD display and a loudspeaker or earphone, or combinations thereof. Such means may be included in the means for reading and transmitting the information; i.e. if the reading and transmitting means is a smartphone, the smartphone may display information in response to instructions from the computing device.

Software for pattern recognition and related functions is available both as proprietary software and as open source material, i.e. OpenCV Thus, a system according to the invention may comprise a reading device, e.g. a smartphone for capturing and transmitting, over a mobile network, an image of a nonwoven material having a pattern displaying at least two groups of areas having different optical properties to a remote computer. A trained image recognition model residing in the computer determines whether the image is relevant for displaying information to the party handling the reading device. Such information may be, for example:
technical information relating to the product, verifying its authenticity and providing data on the location and time of manufacturing, on quality, composition and purpose of use
data related to a sales campaign or competition, based e.g. on season or location
surveys for customer feedback
providing a channel for reporting an anomaly or a product complaint
branded content designed by a manufacturer of a particular product including the relevant nonwoven
instruction for use of a particular product including the relevant nonwoven Also, various visual and audible effects may be triggered to be displayed on the reading device in response to an image of a pattern.

Production lines may be adapted so, that each production line creates a unique pattern, a "fingerprint" that sets it apart from other lines while preserving quality and standard properties in the product. Thus, a product fulfilling a specific standard could have a fingerprint, setting it apart from the same product manufactured using another line. The fingerprints could be identified at least using optical measurement equipment. Machine learning could be utilized for this purpose.

Thus, an aspect of the present invention is the provision of a system for optically identifying unique patterns in like products manufactured on different production lines by defining a required difference, representing a threshold, in at least one optical property; identifying at least one production parameter affecting said optical property/properties; repeatedly observing and storing values for said optical property/properties in production situations; and creating a repository linking a value range for said at least one optical property to a specific production line.

When required, one or several production parameters is adjusted to bring the relevant optical property/properties within a value range satisfying the defined threshold condition.

Examples of production parameters which can be varied for creating identifiable thresholds in optical properties are card, carding speed, randomizer in carding (random roll), line speed, speed differences between sections, hydroentanglement parameters (profile of the strip, water pressure, dewatering which is affected by both the hole size in the support and the vacuum power); drying temperature, line speed in drying.

The same technology may be used for identifying various types, grades, and versions of nonwoven.

Thus, a further aspect of the present invention is the provision of a system for identifying various types, grades and versions of nonwoven by optically identifying unique patterns in different products. Differences in optical properties are caused by differences in fiber properties such as length, dtex, crimp, diameter, shape (round, oval, flat, number of lobes in multilobed fiber), material, melting temperature, opacity, reflection and colour.

Preferably, the repository of properties is a digital memory which can be used in a computerized system.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

The invention claimed is:

1. A nonwoven fiber web material comprising a pattern comprising at least two groups of areas comprising different machine readable optical properties not discernable to the naked eye, said at least two groups of areas arranged to encode optically readable information,
    wherein the at least two groups of areas differ in terms of a mass, a degree of compression, or a density of fibers in the nonwoven fiber web material,
    wherein the nonwoven fiber web material constitutes a sheet, a web, or a batt comprising the at least two groups of areas, and
    wherein the at least two groups of areas comprise:
        a first group that constitutes a majority of the sheet, the web, or the batt and is characterized by a first optical property of the machine readable optical properties, wherein the first optical property is based on the mass, the degree of compression, or the density of the fibers in the first group; and
        a second group that constitutes a localized area within the sheet, the web, or the batt and is characterized by a second optical property of the machine readable optical properties, wherein the second optical property is based on the mass, the degree of compression, or the density of the fibers in the second group and is different from the first optical property.

2. The nonwoven fiber web material of claim 1, wherein the pattern comprises three groups of areas comprising different machine readable optical properties, said areas arranged to encode optically readable information.

3. The nonwoven fiber web material of claim 1, wherein the groups of areas differ in terms of differences caused by carding, hydroentangling, thermoembossing, dewatering or drying parameters.

4. The nonwoven fiber web material of claim 1, wherein the nonwoven fiber web material comprises synthetic fiber.

5. The nonwoven fiber web material of claim 1, wherein the nonwoven fiber web material comprises natural man-made fiber.

6. The nonwoven fiber web material of claim 1, further comprising encoded machine readable optical information comprising a first, static component which does not exhibit variation and a second, dynamic component exhibiting variation over a length of the nonwoven fiber web material.

7. The nonwoven fiber web material of claim 1, further comprising encoded machine readable optical information based on repeated instances of a same graphic symbol disposed at a plurality of rotational orientations.

8. A system comprising a nonwoven fiber web material according to claim 1, and means for reading the non-woven fiber web material for information not discernible to the naked eye and transmitting said information to a computing device.

9. The system according to claim 8, further comprising means in the computing device for triggering an event selected in dependence of the information read from the nonwoven fiber web material.

10. The system according to claim 9, wherein the event is a visual effect.

11. The system according to claim 10, wherein the visual effect involves the display of a dynamic video effect.

12. The system according to claim 9, wherein the event is an audible effect.

13. The nonwoven fiber web material of claim 1, wherein the first group comprises an uncompressed surface, and wherein the second group comprises a surface that is compressed into the nonwoven fiber web material.

14. The nonwoven fiber web material of claim 1, wherein the second group comprises a plurality of second group graphic symbols distributed in a line.

15. The nonwoven fiber web material of claim 1, wherein the second group comprises a plurality of repeating first graphic symbols distributed in a line and a plurality of repeating second graphic symbols distributed in a line, wherein for each second graphic symbol of the plurality of repeating first graphic symbols there is at least one first graphic symbol of the plurality of repeating second graphic symbols.

16. The nonwoven fiber web material of claim 1, wherein the second group comprises a bar code comprising a plurality of parallel lines.

17. The nonwoven fiber web material of claim 1, wherein the at least two groups of areas further comprise a third group that constitutes a localized area within the sheet, the web, or the batt and that is characterized by a third optical property of the optical properties that is based on the mass, the degree of compression, or the density of the fibers in the third group and that is different than both the second optical property and the third optical property.

18. The nonwoven fiber web material of claim 17, wherein the first group comprises an uncompressed surface, wherein the second group comprises a surface that is compressed into the nonwoven fiber web material by a first amount, and wherein the third group comprises a surface that is compressed into the nonwoven fiber web material by a second amount that is greater than the first amount.

19. A method for preparing a nonwoven fiber web material comprising a pattern encoding information for optical machine input, comprising:
providing a nonwoven web, and
providing on the nonwoven web a pattern formed of at least two groups of areas comprising different machine readable optical properties not discernable to the naked eye, said at least two groups of areas arranged to encode optically readable information,
wherein the at least two groups of areas differ in terms of a mass, a degree of compression, or a density of the fibers in the nonwoven fiber web material,
wherein the nonwoven fiber web material constitutes a sheet, a web, or a batt comprising the at least two groups of areas,
wherein the at least two groups of areas comprise:
a first group that constitutes a majority of the sheet, the web, or the batt and is characterized by a first optical property of the machine readable optical properties, wherein the first optical property is based on the mass, the degree of compression, or the density of the fibers in the first group; and
a second group that constitutes a localized area within the sheet, the web, or the batt and is characterized by a second optical property of the machine readable optical properties, wherein the second optical property is based on the mass, the degree of compression, or the density of the fibers in the second group and is different from the first optical property.

20. The method of claim 19, wherein the at least two groups of areas comprising different machine readable optical properties are provided by embossing the pattern into the nonwoven web with an embossing sleeve.

21. The method of claim 19, wherein the groups of areas differ in terms of differences caused by carding, hydroentangling, thermoembossing, dewatering or drying parameters.

22. The method of claim 19, wherein the optically readable information comprises a first, static component which does not exhibit variation and a second, dynamic component exhibiting variation over a length of the nonwoven fiber web material.

23. The method of claim 22, wherein the first, static component and the second, dynamic component are formed in the nonwoven fiber web material via hydroembossing.

24. The method of claim 22, wherein the first, static component is generated using hydroembossing and the second, dynamic component is generated using laser or ultrasound.

25. The method of claim 19, wherein the pattern is provided on the nonwoven web by embossing the nonwoven web with two or more modular embossing rolls with different patterns.

* * * * *